UNITED STATES PATENT OFFICE 2,026,026

ARYLAMINO SUBSTITUTED 1,4,5,8-NAPHTHOYLENE-DI-(ARYLIMIDAZOLE) CONDENSATION PRODUCTS

Wilhelm Eckert and Otto Braunsdorf, Frankfort-on-the-Main, Germany, assignors to General Aniline Works, Inc., New York, N. Y., a corporation of Delaware No Drawing. Application March 4, 1935, Serial No. 9,347. In Germany March 7, 1934

12 Claims. (Cl. 260—36)

The present invention relates to vat dyestuffs and to a process of preparing them.

We have found that new valuable vat dyestuffs are obtainable by treating at an elevated temperature, for instance, at a temperature between about 140° C. and about 250° C., an aryl-amino substituted 1,4,5,8-naphthoylene-di-(arylimidazole) with an acid condensing agent, advantageously with aluminium chloride either alone or mixed with a flux, for instance, sodium chloride or the like.

The constitution of the new vat dyestuffs is unknown. Perhaps they are carbazole derivatives. They have a great dyeing power and yield dyeings of very good fastness properties.

The parent materials used in the present process, namely the arylamino substituted 1,4,5,8-naphthoylene-di-(arylimidazoles) may be prepared, for instance, according to U. S. Patent No. 1,928,719, for instance, by condensing 1,4,5,8-naphthoylene - di - (halogenarylimidazoles) with amino compounds or 1,4,5,8-naphthoylene-di-(aminoarylimidazoles) with compounds containing halogen.

The following examples serve to illustrate the invention but they are not intended to limit it thereto, the parts being by weight:

(1) 10 parts of di-alpha-anthraquinonylamino-naphthoylene-dinaphth-di-imidazole, obtainable, for instance, by condensation of alpha-aminoanthraquinone with the dibromo substitution product of the dyestuff obtainable from 1,4,5,8-naphthalene-tetra-carboxylic acid and 1,2-diaminonaphthalene, according to U. S. Patent No. 1,928,719, are dissolved in 80 to 100 parts of a sodium chloride—aluminium chloride melt and the whole is stirred at temperatures above 200° C. until a test portion taken from the melt and worked up no longer changes its color. The melt is then cooled a little and introduced into dilute hydrochloric acid. The dyestuff separates in the form of black flakes which are filtered with suction and washed with hot water. In the dry state the product forms a black powder which is nearly insoluble even in organic solvents of high boiling point. In concentrated sulfuric acid it dissolves to a brown solution and dyes cotton from a brown alkaline hydrosulfite vat reddish gray tints.

(2) By treating the easily soluble red dyestuff obtainable according to U. S. Patent No. 1,927,928, Example 1, with a halogen, for instance bromine, dihalogen substitution products are easily obtained which may be reacted with alpha-aminoanthraquinones in suitable solvents with addition of acid binding agents.

10 parts of the reaction product thus obtained by means of alpha-aminoanthraquinone and corresponding with the following probable formula:

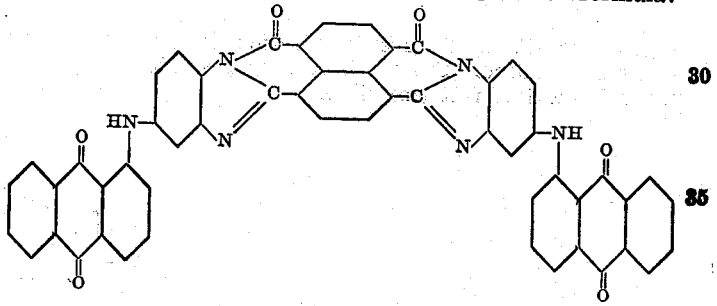

are introduced at 130° C. to 140° C. into a melt of 40 parts of aluminium chloride and 10 parts of sodium chloride and the whole is stirred. The temperature is then raised to 190° C. to 200° C. and maintained for several hours. The melt is allowed to cool a little and introduced into dilute hydrochloric acid whereby the dyestuff separates in the form of dark brown flakes. It is filtered with suction, washed with water until neutral and dried. It forms a nearly black powder which scarcely dissolves in organic solvents. It dissolves in concentrated sulfuric acid to a reddish brown solution. The alkaline hydrosulfite vat is brown and cotton is dyed therefrom vivid black-brown tints of very good fastness properties.

(3) By causing the halogenated dyestuff mentioned in Example (2) to react with 1-amino-2-methyl-anthraquinone and by melting the product thus obtained which has the following probable constitution:

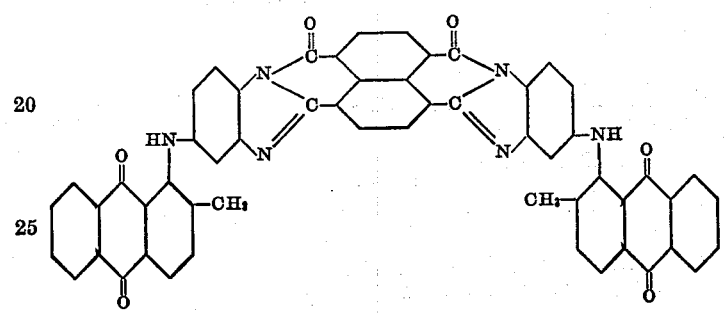

with 8 to 10 times its weight of a mixture of sodium chloride and aluminium chloride (1:4) at about 140° C., a dark brown dyestuff is obtained. It dissolves in concentrated sulfuric acid to a red solution and dyes the cotton fiber from a brown hydrosulfite vat very fast black-brown tints.

(4) By replacing in Example (1) 1-amino-2-methylanthraquinone by 1-amino-4-benzoylaminoanthraquinone and proceeding otherwise as indicated in the preceding examples, there is obtained from the product of the following constitution:

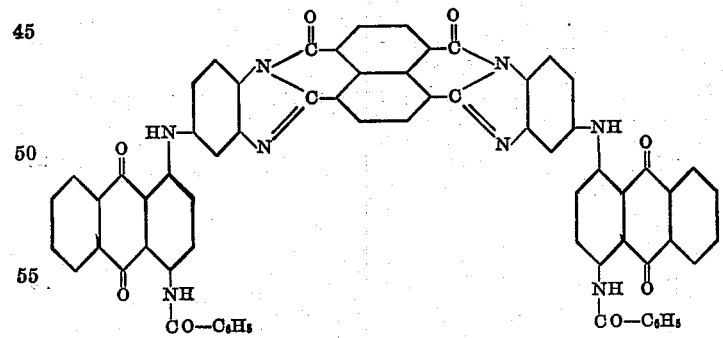

a gray dyestuff. It dissolves in sulfuric acid to a gray-blue solution. From a brown hydrosulfite vat cotton is dyed fast gray tints.

We claim:
1. The process which comprises melting with aluminium chloride a di-(anthraquinonylamino)-1,4,5,8-naphthoylene-di-(arylimidazole) compound which is obtainable by causing an amino-anthraquinone to react with a 1,4,5,8-naphthoylene-di-(arylimidazole) the aryl groups of which belong to the group of benzene and naphthalene and contain a halogen atom.

2. The process which comprises melting with aluminium chloride in presence of sodium chloride a di-(anthraquinonylamino)-1,4,5,8-naphthoylene-di-(arylimidazole) compound which is obtainable by causing an alpha-amino-anthraquinone to react with a 1,4,5,8-naphthoylene-di-(arylimidazole) the aryl groups of which belong to the group of benzene and naphthalene and contain a halogen atom.

3. The process which comprises melting at a temperature of between about 140° C. and 250° C. with aluminium chloride in presence of sodium chloride a di-anthraquinonylamino)-1,4,5,8-naphthoylene-di-(arylimidazole) compound which is obtainable by causing an alpha-amino-anthraquinone to react with a 1,4,5,8-naphthoylene-di-(phenylimidazole) the phenyl groups of which contain a halogen atom.

4. The process which comprises melting at about 140° C. to about 200° C. with a mixture of aluminium chloride and sodium chloride (4:1) the compound of the formula:

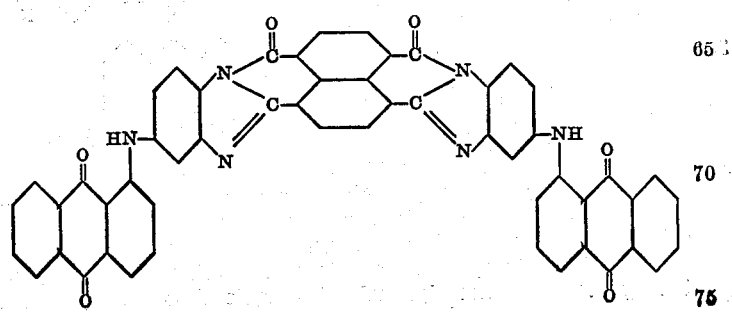

5. The process which comprises melting at about 140° C. with a mixture of aluminium chloride and sodium chloride (4:1) the compound of the formula:

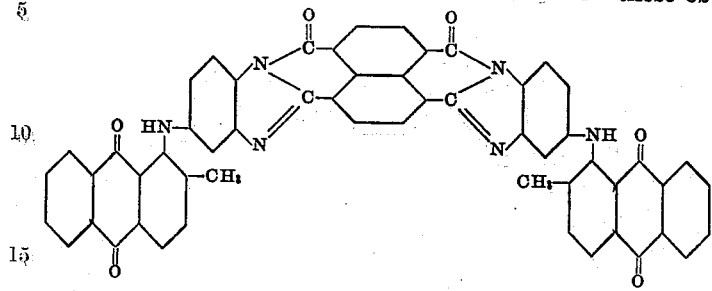

6. The process which comprises melting at about 140° C. with a mixture of aluminium chloride and sodium chloride (4:1) the compound of the formula:

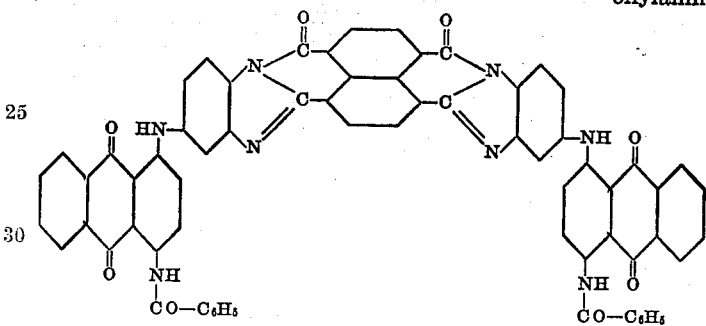

7. The compounds which are identical with those obtainable by the process which comprises melting with aluminium chloride a di-(anthraquinonylamino) - 1,4,5,8 - naphthoylene-di-(arylimidazole) compound which is obtainable by causing an amino-anthraquinone to react with a 1,4,5,8 - naphthoylene-di-(arylimidazole) the aryl groups of which belong to the group of benzene and naphthalene and contain a halogen atom.

8. The compounds which are identical with those obtainable by the process which comprises melting with aluminium chloride in presence of sodium chloride a di-(anthraquinonyl-amino)- 1,4,5,8 - naphthoylene - di - (arylimidazole) compound which is obtainable by causing an alpha-amino-anthraquinone to react with a 1,4,5,8-naphthoylene-di-(arylimidazole) the aryl groups of which belong to the group of benzene and naphthalene and contain a halogen atom.

9. The compounds which are identical with those obtainable by the process which comprises melting at a temperature of between about 140° C. and 250° C. with aluminium chloride in presence of sodium chloride a di-(anthraquinonylamino)-1,4,5,8-naphthoylene-di-(aryl-imidazole) compound which is obtainable by causing an alpha-amino-anthraquinone to react with a 1,4,5,8-naphthoylene-di-(phenyl)-imidazole) the phenyl groups of which contain a halogen atom.

10. The compounds which are identical with that obtainable by the process which comprises melting at about 140° C. to about 200° C. with a mixture of aluminium chloride and sodium chloride (4:1) the compound of the formula:

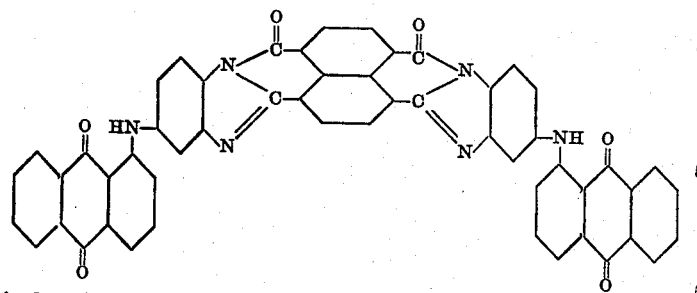

forming a nearly black powder which dyes cotton from a brown hydrosulfite vat vivid black-brown tints of very good fastness.

11. The compounds which are identical with that obtainable by the process which comprises melting at about 140° C. with a mixture of aluminium chloride and sodium chloride (4:1) the compound of the formula:

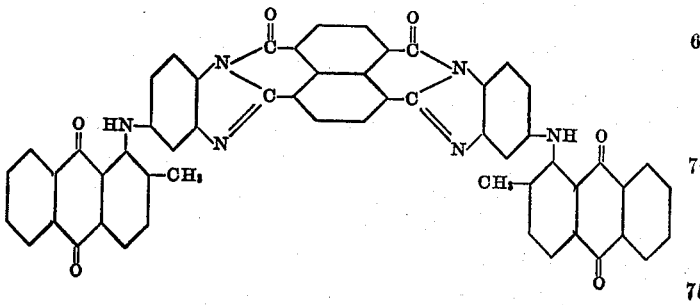

being a dark brown dyestuff which dyes cotton fiber from a brown hydrosulfite vat very fast black-brown tints.

12. The compounds which are identical with that obtainable by the process which comprises melting at about 140° C. with a mixture of aluminium chloride and sodium chloride (4:1) the compound of the formula:

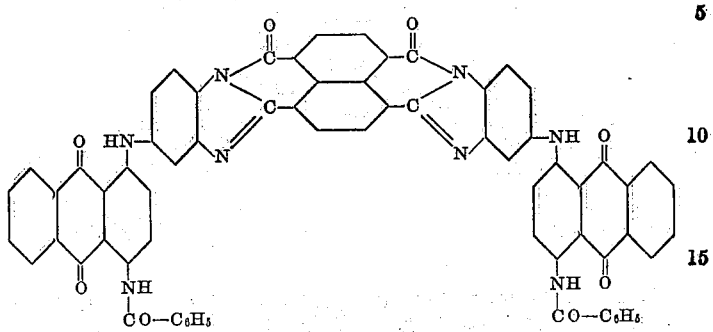

being a gray dyestuff which dyes cotton from a brown hydrosulfite vat fast gray tints.

WILHELM ECKERT.
OTTO BRAUNSDORF.